US009827888B2

(12) United States Patent
Patrick et al.

(10) Patent No.: US 9,827,888 B2
(45) Date of Patent: Nov. 28, 2017

(54) SEAT ASSEMBLIES WITH ADJUSTABLE SIDE BOLSTER ACTUATORS

(71) Applicant: Lear Corporation, Southfield, MI (US)

(72) Inventors: Gerald Patrick, Shelby Township, MI (US); Samuel Hanlon, Livonia, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 14/987,026

(22) Filed: Jan. 4, 2016

(65) Prior Publication Data
US 2017/0190271 A1 Jul. 6, 2017

(51) Int. Cl.
B60N 2/02 (2006.01)
B60N 2/44 (2006.01)

(52) U.S. Cl.
CPC ......... *B60N 2/4415* (2013.01); *B60N 2/0244* (2013.01); *B60N 2/4492* (2015.04); *B60N 2002/0272* (2013.01)

(58) Field of Classification Search
CPC .. B60N 2/4415; B60N 2/4492; B60N 2/0244; B60N 2/0272
USPC .......................................... 297/284.9, 452.41
See application file for complete search history.

(56) References Cited

U.S. PATENT DOCUMENTS

| 4,477,874 A | 10/1984 | Ikuta et al. |
| 4,679,855 A * | 7/1987 | Hattori ................. B60N 2/4492 297/284.9 |
| 5,019,759 A | 5/1991 | Takemura et al. |
| 5,707,109 A | 1/1998 | Massara et al. |
| 5,967,608 A | 10/1999 | Van Sickle |
| 5,975,633 A * | 11/1999 | Walk .................. B60N 2/42727 297/284.9 X |
| 6,088,642 A * | 7/2000 | Finkelstein ............ B60N 2/002 297/284.1 |

(Continued)

FOREIGN PATENT DOCUMENTS

| CN | 1087804 A | 6/1994 |
| CN | 101161500 A | 4/2008 |

(Continued)

OTHER PUBLICATIONS

U.S. Appl. No. 14/716,197, entitled "Adjustable Seat Assembly", filed May 19, 2015, 22 pages.

(Continued)

*Primary Examiner* — Rodney B White
(74) *Attorney, Agent, or Firm* — Brooks Kushman P.C.

(57) ABSTRACT

A seat assembly is provided with a seat bottom, and a seat back extending upright from the seat bottom. At least two side bolster actuators are spaced apart laterally and are provided in bolster regions of at least one of the seat bottom and the seat back. A plurality of sensors is operably connected to the two side bolster actuators to detect a seating position of an occupant. A controller is in electrical communication with the plurality of sensors and the two side bolster actuators. The controller is programmed to receive data from the plurality of sensors. The controller compares the data to determine if the occupant is seated evenly. The controller adjusts at least one of the two side bolster actuators to balance an uneven left-to-right occupant seating position.

12 Claims, 3 Drawing Sheets

(56) References Cited

U.S. PATENT DOCUMENTS

| | | | |
|---|---|---|---|
| 6,088,643 A * | 7/2000 | Long | A47C 4/54 297/284.3 |
| 6,129,419 A | 10/2000 | Neale | |
| 6,203,105 B1 | 3/2001 | Rhodes, Jr. | |
| 6,220,667 B1 * | 4/2001 | Wagner | B60N 2/002 297/284.9 X |
| 6,273,810 B1 | 8/2001 | Rhodes, Jr. et al. | |
| 6,289,538 B1 | 9/2001 | Fidge | |
| 6,392,550 B1 | 5/2002 | Najor | |
| 6,398,303 B1 | 6/2002 | Herrmann et al. | |
| 6,578,916 B2 | 6/2003 | Longhi et al. | |
| 6,592,533 B1 | 7/2003 | Yonekawa et al. | |
| 6,682,059 B1 | 1/2004 | Daniels et al. | |
| 7,131,697 B2 * | 11/2006 | Beermann | B60N 2/22 297/284.9 |
| 7,152,920 B2 | 12/2006 | Sugiyama et al. | |
| 7,537,286 B2 | 5/2009 | Walker et al. | |
| 7,663,502 B2 | 2/2010 | Breed | |
| 7,797,771 B1 | 9/2010 | Bossen et al. | |
| 7,865,375 B2 | 1/2011 | Lancaster et al. | |
| 7,905,548 B2 * | 3/2011 | Gupta | B60N 2/0224 297/284.9 |
| 7,917,264 B2 | 3/2011 | Hozumi et al. | |
| 7,967,379 B2 | 6/2011 | Walters et al. | |
| 8,054,203 B2 | 11/2011 | Breed et al. | |
| 8,123,296 B2 * | 2/2012 | Rager | B60N 2/4415 297/284.9 X |
| 8,251,447 B2 | 8/2012 | Fujita et al. | |
| 8,348,339 B2 | 1/2013 | Onuma et al. | |
| 8,474,908 B2 | 7/2013 | Petzel et al. | |
| 8,596,716 B1 | 12/2013 | Caruso | |
| 8,616,654 B2 | 12/2013 | Zenk et al. | |
| 8,690,249 B2 | 4/2014 | Kang et al. | |
| 8,775,018 B2 * | 7/2014 | Uenuma | B60N 2/0232 297/284.9 |
| 8,931,837 B2 | 1/2015 | Vernon | |
| 8,958,955 B2 | 2/2015 | Hotary et al. | |
| 9,049,973 B1 | 6/2015 | Walker | |
| 9,381,840 B2 | 7/2016 | Tobata et al. | |
| 2002/0056709 A1 | 5/2002 | Burt | |
| 2002/0089220 A1 * | 7/2002 | Achleitner | B60N 2/449 297/284.9 |
| 2002/0096915 A1 | 7/2002 | Haupt et al. | |
| 2002/0167486 A1 | 11/2002 | Tan et al. | |
| 2003/0023363 A1 * | 1/2003 | Katz | B60N 2/0244 297/284.9 X |
| 2003/0080699 A1 | 5/2003 | Rumney | |
| 2003/0226399 A1 | 12/2003 | Clingerman et al. | |
| 2005/0067868 A1 | 3/2005 | Kern et al. | |
| 2006/0061315 A1 | 3/2006 | Schmidt et al. | |
| 2006/0103193 A1 | 5/2006 | Kramer | |
| 2006/0290175 A1 | 12/2006 | Hartwich | |
| 2007/0106188 A1 | 5/2007 | Walker | |
| 2008/0009989 A1 | 1/2008 | Kim et al. | |
| 2008/0116730 A1 | 5/2008 | Connolly et al. | |
| 2008/0255731 A1 | 10/2008 | Mita et al. | |
| 2008/0267460 A1 | 10/2008 | Aoki et al. | |
| 2008/0277985 A1 | 11/2008 | Petzel | |
| 2009/0026821 A1 * | 1/2009 | Macht | B60N 2/4492 297/284.9 |
| 2009/0030578 A1 | 1/2009 | Periot et al. | |
| 2009/0058661 A1 | 3/2009 | Gleckler et al. | |
| 2009/0088930 A1 | 4/2009 | Ohtsubo et al. | |
| 2009/0099490 A1 | 4/2009 | Durt et al. | |
| 2009/0107258 A1 | 4/2009 | Saitoh et al. | |
| 2009/0218858 A1 * | 9/2009 | Lawall | B60N 2/4235 297/284.9 X |
| 2010/0045087 A1 * | 2/2010 | Pyun | B60N 2/3011 297/284.9 |
| 2010/0244504 A1 | 9/2010 | Colja et al. | |
| 2010/0276973 A1 | 11/2010 | Zenk et al. | |
| 2010/0283299 A1 | 11/2010 | Onuma et al. | |
| 2011/0031788 A1 | 2/2011 | Kosik et al. | |
| 2011/0112449 A1 | 5/2011 | Hopf et al. | |
| 2011/0210590 A1 * | 9/2011 | Mori | B60N 2/4492 297/284.9 |
| 2012/0053794 A1 | 3/2012 | Alcazar et al. | |
| 2012/0086249 A1 | 4/2012 | Hotary et al. | |
| 2012/0096960 A1 | 4/2012 | Galbreath et al. | |
| 2012/0259248 A1 | 10/2012 | Receveur | |
| 2012/0283929 A1 | 11/2012 | Wakita et al. | |
| 2013/0009761 A1 | 1/2013 | Horseman | |
| 2013/0090816 A1 | 4/2013 | Huber | |
| 2013/0166078 A1 | 6/2013 | Heger et al. | |
| 2013/0175838 A1 | 7/2013 | Oshima et al. | |
| 2013/0251216 A1 | 9/2013 | Smowton et al. | |
| 2013/0313871 A1 | 11/2013 | Shalaby et al. | |
| 2014/0163333 A1 | 6/2014 | Horseman | |
| 2014/0167463 A1 | 6/2014 | Sakata et al. | |
| 2014/0319895 A1 | 10/2014 | Lange-Mao et al. | |
| 2014/0361590 A1 * | 12/2014 | Line | B60N 2/449 297/284.9 |
| 2015/0008710 A1 | 1/2015 | Young et al. | |
| 2015/0084985 A1 | 3/2015 | Baudu | |
| 2015/0097400 A1 * | 4/2015 | Heys | B60N 2/4492 297/284.9 X |
| 2015/0099245 A1 | 4/2015 | Bouchard et al. | |
| 2015/0136146 A1 | 5/2015 | Hood et al. | |
| 2015/0145296 A1 | 5/2015 | Hotary et al. | |
| 2015/0196131 A1 | 7/2015 | Dacosta-Mallet et al. | |
| 2015/0202993 A1 * | 7/2015 | Mankame | B60N 2/002 297/284.9 X |
| 2015/0351692 A1 | 12/2015 | Pereny et al. | |
| 2015/0352979 A1 | 12/2015 | O'Bannon et al. | |
| 2015/0352990 A1 | 12/2015 | Zouzal et al. | |
| 2015/0367751 A1 * | 12/2015 | Lamesch | B60N 2/002 297/180.12 |
| 2016/0101710 A1 * | 4/2016 | Bonk | B60N 2/0252 297/217.2 |
| 2016/0297337 A1 | 10/2016 | White et al. | |
| 2016/0339801 A1 * | 11/2016 | Pereny | B60N 2/0244 |
| 2016/0339802 A1 * | 11/2016 | Hanlon | B60N 2/0244 |

FOREIGN PATENT DOCUMENTS

| | | |
|---|---|---|
| CN | 101374695 A | 2/2009 |
| CN | 201329822 Y | 10/2009 |
| CN | 101731862 A | 6/2010 |
| CN | 201646470 U | 11/2010 |
| CN | 101992708 A | 3/2011 |
| CN | 102015362 A | 4/2011 |
| CN | 102099227 A | 6/2011 |
| CN | 104252615 A | 12/2014 |
| DE | 19908655 C1 | 8/2000 |
| DE | 10331624 B3 | 4/2005 |
| DE | 10353020 A1 | 6/2005 |
| DE | 102005034069 A1 | 1/2007 |
| DE | 102005038289 B3 | 3/2007 |
| DE | 102006036532 A1 | 2/2008 |
| DE | 102009028846 A1 | 3/2010 |
| DE | 102009021532 A1 | 11/2010 |
| DE | 102011010210 A1 | 12/2011 |
| DE | 102010056568 A1 | 7/2012 |
| DE | 102012216869 A1 | 3/2014 |
| DE | 102012216178 A1 | 5/2014 |
| DE | 102013216621 A1 | 2/2015 |
| EP | 0489310 A1 | 6/1992 |
| EP | 2353928 A1 | 8/2011 |
| EP | 2353928 B1 | 9/2014 |
| FR | 2988051 A1 | 9/2013 |
| FR | 2988654 A1 | 10/2013 |
| FR | 2994073 A1 | 2/2014 |
| GB | 2370222 A | 6/2002 |
| GB | 2523584 B | 1/2016 |
| TW | 477405 Y | 5/2002 |
| WO | 2005074754 A1 | 8/2005 |
| WO | 2011144280 A1 | 11/2011 |
| WO | 2012159688 A1 | 11/2012 |
| WO | 2013144498 A1 | 10/2013 |
| WO | 2013170335 A1 | 11/2013 |

(56) References Cited

FOREIGN PATENT DOCUMENTS

| WO | 2014066493 A2 | 5/2014 |
| WO | 2014085302 A1 | 6/2014 |

OTHER PUBLICATIONS

U.S. Appl. No. 14/716,191, entitled "Adjustable Seat Assembly", filed May 19, 2015, 24 pages.
U.S. Appl. No. 14/869,093, entitled "Air Bladder Assembly for Seat Bottoms of Seat Assemblies", filed Sep. 29, 2015, 14 pages.

* cited by examiner

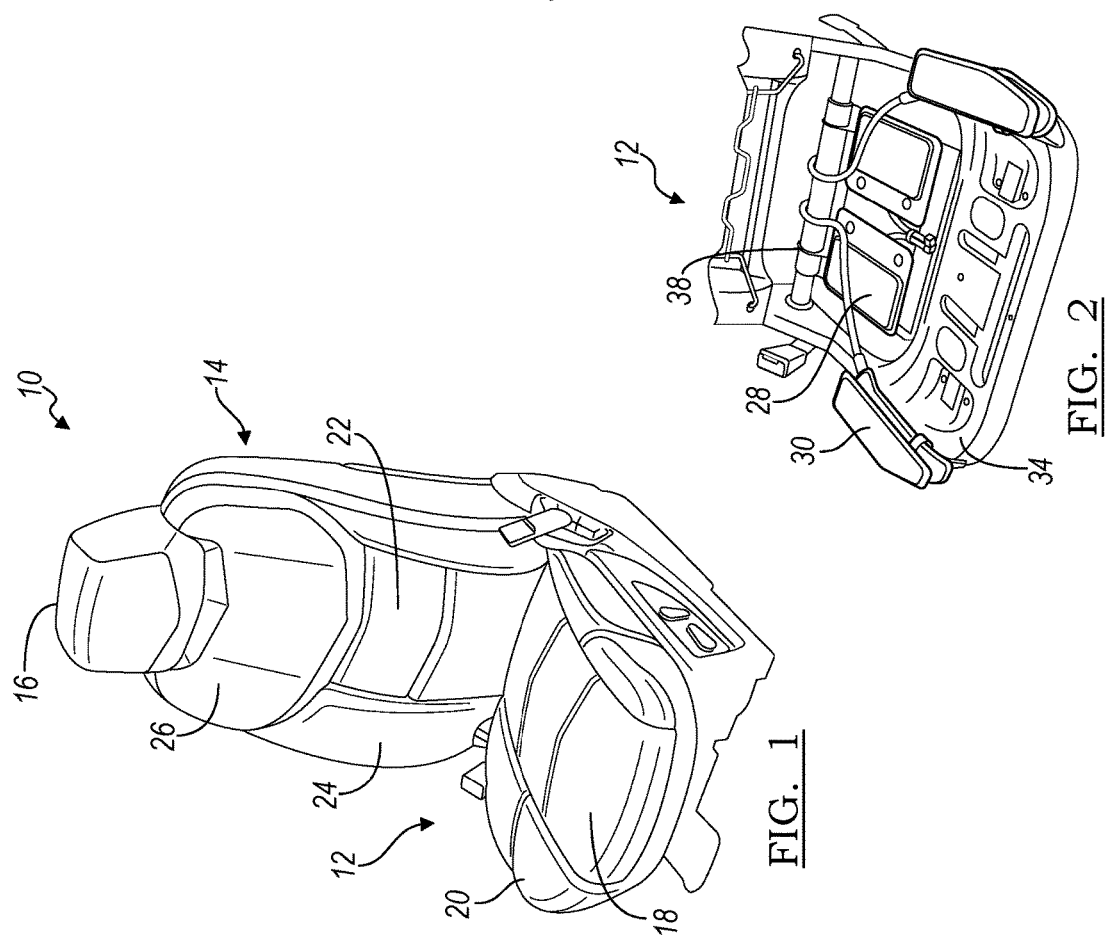

SEAT ASSEMBLIES WITH ADJUSTABLE SIDE BOLSTER ACTUATORS

TECHNICAL FIELD

Various embodiments relate to seat assemblies with adjustable side bolster actuators.

BACKGROUND

An adjustable seat assembly is illustrated and described in U.S. Pat. No. 5,758,924, which issued on Jun. 2, 1998 to Lear Corporation.

SUMMARY

According to at least one embodiment, a seat assembly is provided with a seat bottom, and a seat back extending upright from the seat bottom. At least two side bolster actuators are spaced apart laterally and are provided in bolster regions of at least one of the seat bottom and the seat back. A plurality of sensors is operably connected to the at least two side bolster actuators to detect a seating position of an occupant. A controller is in electrical communication with the plurality of sensors and the at least two side bolster actuators. The controller is programmed to receive data from the plurality of sensors. The controller compares the data to determine if the occupant is seated evenly. The controller adjusts at least one of the at least two side bolster actuators to balance an uneven left-to-right occupant seating position.

According to at least another embodiment, a seating system is provided with a seat assembly with a seat bottom and a seat back extending upright from the seat bottom. At least two side bolster actuators are spaced apart laterally and are provided in bolster regions of at least one of the seat bottom and the seat back. A plurality of sensors is operably connected to the at least two side bolster actuators to detect a seating position of an occupant. A controller is in electrical communication with the plurality of sensors and the at least two side bolster actuators. The controller is programmed to receive data from the plurality of sensors. The controller compares the data to determine if the occupant is seated evenly. The controller adjusts at least one of the at least side bolster actuators to balance an uneven left-to-right occupant seating position. A media device is provided with a graphical user interface. The controller is in electrical communication with the media device. The controller is further programmed to operate the media device to inform the occupant of an uneven left-to-right seating position.

According to at least another embodiment, a seat assembly is provided with a seat bottom, and a seat back extending upright from the seat bottom. At least two side bolster actuators are spaced apart laterally and are provided in bolster regions of at least one of the seat bottom and the seat back. A plurality of sensors is operably connected to the at least two side bolster actuators to detect a seating position of an occupant. A controller is in electrical communication with the plurality of sensors and the at least two side bolster actuators. The controller is programmed to receive data from the plurality of sensors. The controller compares the data to determine if the occupant is seated according to a predetermined wellness position. The controller adjusts at least one of the at least two side bolster actuators to adjust the occupant seating position to the predetermined wellness position.

According to at least another embodiment, a seating system is provided with a seat assembly with a seat bottom and a seat back extending upright from the seat bottom. At least two side bolster actuators are spaced apart laterally and are provided in bolster regions of at least one of the seat bottom and the seat back. A plurality of sensors is operably connected to the at least two side bolster actuators to detect a seating position of an occupant. A controller is in electrical communication with the plurality of sensors and the at least two side bolster actuators. The controller is programmed to receive data from the plurality of sensors. The controller compares the data to determine if the occupant is seated according to a predetermined wellness position. The controller adjusts at least one of the at least two side bolster actuators to adjust the occupant seating position to the predetermined wellness position. A media device is provided with a graphical user interface. The controller is in electrical communication with the media device. The controller is further programmed to operate the media device to inform the occupant of an uneven left-to-right seating position.

According to at least another embodiment, a seat assembly is provided with a seat bottom, and a seat back extending upright from the seat bottom. At least two side bolster actuators are spaced apart laterally and are provided in bolster regions of at least one of the seat bottom and the seat back. A plurality of sensors is operably connected to the at least two side bolster actuators to detect a seating position of an occupant. A media device is provided with a graphical user interface. A controller is in electrical communication with the plurality of sensors and the media device. The controller is programmed to receive data from the plurality of sensors. The controller compares the data to determine if the occupant is seated evenly. The controller operates the media device to inform the occupant of an uneven left-to-right seating position.

BRIEF DESCRIPTION OF THE DRAWINGS

FIG. 1 is a front perspective view of a seat assembly according to an embodiment;

FIG. 2 is a front perspective view of a seat bottom of the seat assembly of FIG. 1, according to an embodiment, illustrated partially disassembled;

FIG. 3 is a front perspective view of a seat back of the seat assembly of FIG. 1, according to an embodiment, illustrated partially disassembled;

DETAILED DESCRIPTION

Figure 4:
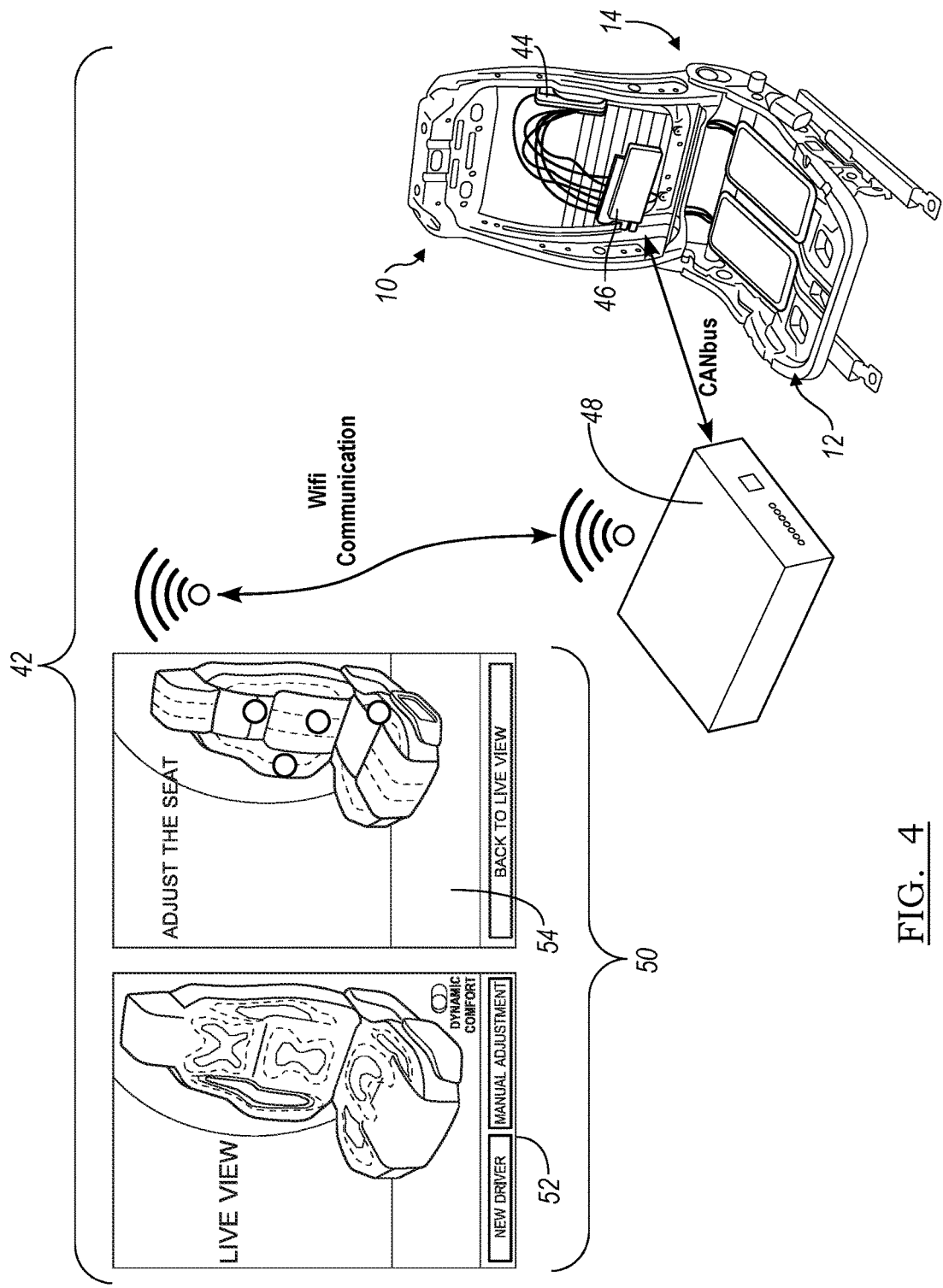
FIG. 4 is a schematic view of a seating system according to an embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1 illustrates a seat assembly 10 according to an embodiment. The seat assembly 10 may be utilized as a vehicle seat assembly 10 for seating in a vehicle, such as an automobile, an aircraft, a watercraft, or the like. Of course, the seat assembly 10 may be utilized in any seating environment that may benefit from an adjustable seat assembly 10.

The seat assembly 10 includes a seat bottom 12, which may be adapted to be mounted for motor-driven adjustable translation in a fore and aft direction and in an up and down direction of a vehicle. The seat assembly 10 includes a seat back 14, which may be pivotally connected to the seat bottom 12 to extend generally upright relative to the seat bottom 12 for motor-driven pivotal adjustment relative to the seat bottom 12. A head restraint 16 may also be mounted for motor-driven adjustable translation to the seat back 14.

The seat bottom 12 includes a central seating surface 18 and a pair of side bolster regions 20 laterally spaced about the central seating surface 18. The seat back 14 includes a pelvic/lumbar seating surface 22 with a pair of laterally spaced apart side bolster regions 24 on either side. A thoracic/shoulder seating surface 26 is provided above the pelvic/lumbar seating surface 22 and the seat back side bolster regions 24.

FIGS. 2 and 3 illustrate the seat assembly 10 with a cover and trim removed for revealing underlying components. The seat bottom 12 includes a pair of pelvis actuators, such as air bladder assemblies 28 under the central seating surface 18. The seat bottom 12 also includes a pair of side bolster actuators, such as air bladder assemblies 30, each located in one of the seat bottom side bolster regions 20. Likewise, the seat back 14 includes a pair of side bolster actuators, such as air bladder assemblies 32, each located in one of the seat back side bolster regions 24. Each of the side bolster air bladder assemblies 30, 32 is supported upon a frame 34, 36 of the corresponding seat bottom 12 and seat back 14. The pelvis air bladder assemblies 28 may be supported upon a suspension 38, which is in turn supported upon the seat bottom frame 34. The seat back 14 also includes a suspension 40. Additional air bladder assemblies may also be provided upon the seat back suspension 40. Although air bladder assemblies 28, 30, 32 are disclosed, any actuator is contemplated that is suitable for performing the adjustment.

The seat assembly 10 provides lateral support to a seated occupant when the vehicle experiences a turn or cornering. In the case of a cornering vehicle, occupant weight is shifted away from the center of its turn. The seat assembly 10 provides support in the seat back 14 and the seat bottom 12 to support the occupant's weight shift away from the center of the vehicle turn. The seat assembly utilizes the pneumatic bladder assemblies 30, 32 in the bolster regions 20, 24 of the seat bottom 12 and the seat back 14, which sense an occupant's weight shift via a change in the internal pressure of the bolster bladder assemblies 30, 32. The seat assembly 10 then inflates the side bolster air bladder assemblies 30, 32 in the seat bottom 12 and/or the seat back 14 to provide lateral support during the cornering event.

FIG. 4 illustrates an adjustable seat system 42 according to an embodiment. The seat system 42 includes the seat assembly 10, which is illustrated with a cover and cushioning removed for revealing underlying components. A compressor 44 provides a source of air to the seat assembly 10. A memory control seat module (MCSM) and valve bank are provided on the seat back 14 and identified generally as a controller 46. The controller 46 regulates compressed air into and out of the seat assembly 10. The controller 46 communicates with a gateway module 48 through a CANbus connection. The gateway module 48 may be installed in or under the seat, or anywhere in the vehicle.

The gateway module 48 communicates with an interface 50 via a wireless communication. The interface 50 may be integrated into the vehicle, such as an instrument panel display that is in suitable wired or wireless communication with the controller 46. The interface 50 may be remote, such as a smart device including phones, tablets and the like. The interface 50 is depicted as a smart device application. The remote interface 50 may permit a user to transport settings to each vehicle, such as personal passenger vehicles, airline seating, rental cars, and the like. The smart device application is further described in Pereny et al. U.S. patent application Ser. No. 14/560,487 filed on Dec. 4, 2014, which is incorporated in its entirety by reference herein.

FIG. 4 illustrates two display images 52, 54 from the interface 50. Each of the air bladder assemblies 28, 30, 32 may include at least one pressure sensor to detect air pressure in the respective air bladder assembly 28, 30, 32. Any pressure sensor is contemplated, such as a pneumatic pressure sensor at the outlet valve of each respective air bladder assembly 28, 30, 32. Pressure can also be sensed by contact pressure sensors disposed in front of or behind some or all of the respective air bladder assemblies 28, 30, 32, including on a front or rear surface thereof. The contact pressure sensors may include pressure-sensing mats, such as those available by Tekscan®, Inc. of 307 West First Street, South Boston, Mass., 02127-1309, USA. Display image 52 depicts the vehicle seat assembly 10 with zones ranging in color to depict a distribution of pressure upon the seat assembly 10. This visualization may assist an occupant in positioning upon the seat assembly 10 with live visual feedback.

The seat system 42 improves an occupant seating position by providing a power pneumatic support in the seat assembly 10 which provides lateral support to the occupant in a seated position to correct unbalanced seating conditions caused by turning or cornering of the vehicle. The side bolster air bladder assemblies 30, 32 are specifically shaped to center an occupant.

The seat system 42 can detect differences in air pressure (LH/RH) at the controller 46 and graphically display the pressure distribution on the display image 52. Corrections can be made to the air pressures RH/LH in the air bladder assemblies 28, 30, 32 via an algorithm in the controller 46. Alternatively individual adjustment can be input by the occupant or user at display image 54 of the interface 50. Each side bolster air bladder assembly 30, 32 can be adjusted individually to achieve an optimum support condition for a variety preferences. The manual and automatic adjustment may both be offered by the seating system 42 under different seat settings which may be selected at the interface 50.

Figure 5:
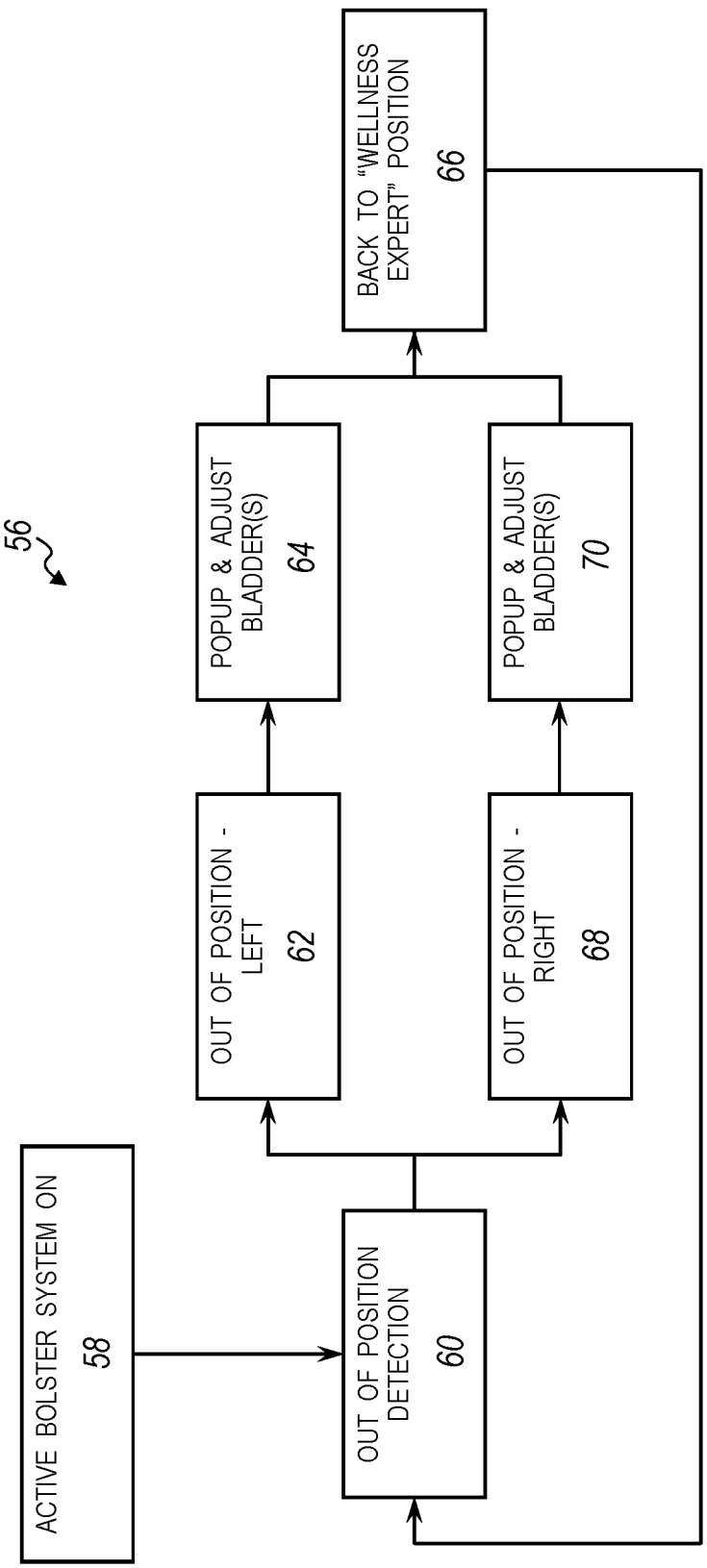
FIG. 5 is a flowchart for a method of adjusting the seating system of FIG. 4.

FIG. 5 illustrates a method 56 for adjusting the seat assembly 10 according to an embodiment. The method begins when an Active Bolster System mode is selected at 58. The mode 58 may be manually selected at the interface 50. Alternatively, the mode 58 may be initiated automatically. At block 60, the controller 46 evaluates the data received from the sensors in the air bladder assemblies 28, 30, 32 to determine if the occupant is seated unevenly. According to one embodiment, this determination is performed by comparing left side pressures to right side pressures. According to another embodiment, the out of position detection 60 is performed by comparing the pressure values to a predetermined position, such as a wellness position as selected by a health professional.

If it is determined that the occupant is out of position at block 60, and the occupant is identified as shifted to the left at block 62, then a popup is provided on the interface 50 at block 64 to inform the occupant of automatic adjustment. The increased pressure can also be displayed graphically in the live view image 52.

At block 64, the left side bolster air bladder assembly 30 of the seat bottom 12 is further inflated if the increased pressure was detected at the left side seat bottom air bladder assembly 30. If the left side bolster air bladder assembly 32 of the seat back 14 detected increased pressure, then the left side bolster air bladder assembly 32 is further inflated. The inflation of the air bladder assemblies 30, 32 that detect increased pressure assist in returning the occupant to a central, balanced seating position 66 as defined by a wellness expert.

The out of position detection 60 is repeated to compensate for further detected positions. If it is determined that the occupant is out of position at block 60, and the occupant is identified as shifted to the right at block 68, then a popup is provided on the interface 50 at block 70 to inform the occupant of automatic adjustment.

At block 70, the right side bolster air bladder assembly 30 of the seat bottom 12 is further inflated if the increased pressure was detected at the right side seat bottom air bladder assembly 30. If the right side bolster air bladder assembly 32 of the seat back 14 detected increased pressure, then the right side bolster air bladder assembly 32 is further inflated. The inflation of the air bladder assemblies 30, 32 that detect increased pressure assist in returning the occupant to the central, balanced seating position 66 as defined by the wellness expert.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
    a seat bottom;
    a seat back extending upright from the seat bottom;
    at least two side bolster actuators spaced apart laterally and provided in bolster regions of at least one of the seat bottom and the seat back, wherein the at least two side bolster actuators comprise at least two air bladder assemblies provided in bolster regions of the seat bottom;
    a plurality of sensors operably connected to the at least two side bolster actuators to detect a seating position of an occupant;
    an air bladder assembly provided centrally in the seat bottom; and
    a controller in electrical communication with the plurality of sensors, the at least two side bolster actuators, and the central air bladder assembly of the seat bottom, the controller programmed to:
        receive input indicative of selection of an active bolster system mode,
        receive data from the plurality of sensors,
        compare the data to determine if the occupant is seated evenly,
        adjust at least one of the at least two side bolster actuators to balance an uneven left-to-right occupant seating position only when the active bolster system mode is selected, and
        adjust the central air bladder assembly to balance an uneven left-to-right occupant seating position independent of the active bolster system mode.

2. The seat assembly of claim 1 wherein the at least two side bolster actuators are provided in bolster regions of the seat back.

3. The seat assembly of claim 1 wherein the at least two side bolster actuators comprise:
    a pair of bolster air bladder assemblies provided in bolster regions of the seat bottom; and
    a pair of bolster air bladder assemblies provided in bolster regions of the seat back.

4. A seating system comprising:
    a seat assembly according to claim 1; and
    a media device with a graphical user interface;
    wherein the controller is in electrical communication with the media device; and
    wherein the controller is further programmed to operate the media device to inform the occupant of an uneven left-to-right seating position.

5. The seat assembly of claim 1 wherein the controller is further programmed to:
    compare the data to a predetermined wellness position; and
    adjust at least one of the at least two side bolster actuators to adjust the occupant seating position to the predetermined wellness position.

6. The seat assembly of claim 1 further comprising a second plurality of sensors operably connected to the central air bladder assembly to detect the seating position of the occupant, wherein the controller is in electrical communication with the second plurality of sensors.

7. A seat assembly comprising:
    a seat bottom adapted to be mounted to a vehicle;
    a seat back extending upright from the seat bottom;
    at least two side bolster actuators spaced apart laterally and provided in bolster regions of at least one of the seat bottom and the seat back;
    a plurality of sensors operably connected to the at least two side bolster actuators to detect a seating position of an occupant;
    a controller in electrical communication with the plurality of sensors and the at least two side bolster actuators, the controller programmed to:
        receive data from the plurality of sensors,
        compare the data to determine if the occupant is seated according to a predetermined wellness position, and
        adjust at least one of the at least two side bolster actuators to adjust the occupant seating position to the predetermined wellness position and to balance an uneven left-to-right occupant seating position during turning or cornering of the vehicle; and
    an air bladder assembly provided centrally in the seat bottom;
    wherein the controller is in electrical communication with the central air bladder assembly of the seat bottom;
    wherein the controller is further programmed to adjust the central air bladder assembly to adjust the occupant seating position to the predetermined wellness position and to balance an uneven left-to-right occupant seating position during turning or cornering of the vehicle: and
    wherein the controller is further programmed to:
        receive input indicative of selection of an active bolster system mode, and adjust the at least one of the at least side bolster actuators to balance an uneven left-to-right occupant seating position when the active bolster system mode is selected; and wherein the controller is further programmed to adjust the central air bladder assembly independent of the active bolster system mode.

8. The seat assembly of claim 7 wherein the at least two side bolster actuators are provided in bolster regions of the seat back.

9. The seat assembly of claim 7 wherein the at least two side bolster actuators comprise:

a pair of bolster air bladder assemblies provided in bolster regions of the seat bottom; and a pair of bolster air bladder assemblies provided in bolster regions of the seat back.

10. A seating system comprising:

a seat assembly according to claim 7; and a media device with a graphical user interface;

wherein the controller is in electrical communication with the media device; and wherein the controller is further programmed to operate the media device to inform the occupant of an uneven left-to-right seating position.

11. The seat assembly of claim 7 wherein the at least two side bolster actuators comprise at least two air bladder assemblies provided in bolster regions of the seat bottom.

12. The seat assembly of claim 7 further comprising a second plurality of sensors operably connected to the central air bladder assembly to detect the seating position of the occupant, wherein the controller is in electrical communication with the second plurality of sensors.

* * * * *

UNITED STATES PATENT AND TRADEMARK OFFICE
CERTIFICATE OF CORRECTION

PATENT NO. : 9,827,888 B2  
APPLICATION NO. : 14/987026  
DATED : November 28, 2017  
INVENTOR(S) : Gerald Patrick et al.

Page 1 of 1

It is certified that error appears in the above-identified patent and that said Letters Patent is hereby corrected as shown below:

In the Claims

Column 7, Line 1, Claim 7:  
After "adjust one of the at least one of"  
Delete "the at least" (second occurrence)

Signed and Sealed this  
Twenty-second Day of May, 2018

Andrei Iancu  
*Director of the United States Patent and Trademark Office*